(12) United States Patent
Wang et al.

(10) Patent No.: US 10,657,859 B2
(45) Date of Patent: May 19, 2020

(54) TESTING METHOD FOR SPLICING SCREENS (71) Applicant: BOE TECHNOLOGY GROUP CO., LTD., Beijing (CN)

(72) Inventors: Tieshi Wang, Beijing (CN); Saihua Chen, Beijing (CN); Xuefei Wang, Beijing (CN); Wanpeng Teng, Beijing (CN); Heliang Di, Beijing (CN); Zhihong Du, Beijing (CN); Shanshan Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 6 days.

(21) Appl. No.: 16/410,148

(22) Filed: May 13, 2019

(65) Prior Publication Data

US 2019/0266932 A1    Aug. 29, 2019

Related U.S. Application Data (63) Continuation-in-part of application No. 15/122,702, filed as application No. PCT/CN2015/092919 on Oct. 27, 2015.

(30) Foreign Application Priority Data

Jun. 12, 2015   (CN) .......................... 2015 1 0325070

(51) Int. Cl.
 G09G 3/00    (2006.01)
 G06F 3/14    (2006.01)
 G06T 3/40    (2006.01)

(52) U.S. Cl.
 CPC .......... *G09G 3/006* (2013.01); *G06F 3/1446* (2013.01); *G06T 3/4038* (2013.01)

(58) Field of Classification Search
 CPC ...... H04N 17/045; H04N 17/02; G09G 3/006; G09G 3/1446; G09G 2310/0221; G06T 3/4038
 See application file for complete search history.

(56) References Cited

U.S. PATENT DOCUMENTS 7,834,830 B2    11/2010  Yamazaki et al.
8,730,130 B1    5/2014   Pray et al.
(Continued)

FOREIGN PATENT DOCUMENTS

CN    101076128 A       11/2007
CN    102026003 A   *   4/2011
(Continued)

OTHER PUBLICATIONS

International Search Report of PCT/CN2015/092919 in Chinese, dated Feb. 25, 2016 with English translation.
(Continued)

*Primary Examiner* — Alexander Eisen
*Assistant Examiner* — Kebede T Teshome
(74) *Attorney, Agent, or Firm* — Collard & Roe, P.C.

(57) ABSTRACT

A testing method for splicing screens is provided. The method includes: outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents; and testing the splicing screens through the testing contents, wherein the testing contents include a graduation signal, by which an accurate test is performed on the splicing screens.

8 Claims, 6 Drawing Sheets

(56) References Cited

U.S. PATENT DOCUMENTS

| | | | |
|---|---|---|---|
| 2007/0188636 A1* | 8/2007 | Augusto | H01L 27/14603 348/294 |
| 2009/0033775 A1* | 2/2009 | Kim | G06F 3/0632 348/246 |
| 2011/0164065 A1* | 7/2011 | Mate | G06F 3/1446 345/676 |
| 2014/0028814 A1 | 1/2014 | Choi | |
| 2016/0134862 A1* | 5/2016 | Kang | H04N 9/3147 348/52 |

FOREIGN PATENT DOCUMENTS

| | | |
|---|---|---|
| CN | 102026003 A | 4/2011 |
| CN | 102426514 A | 4/2012 |
| CN | 102929572 A | 2/2013 |
| CN | 103813116 A | 5/2014 |
| CN | 104270626 A | 1/2015 |
| CN | 104867432 A | 8/2015 |
| JP | 2009-181140 A | 8/2009 |
| JP | 2012-142669 A | 7/2012 |

OTHER PUBLICATIONS

Notice of Transmittal of the International Search Report of PCT/CN2015/092919 in Chinese, dated Feb. 25, 2016.
Written Opinion of the International Searching Authority of PCT/CN2015/092919 in Chinese, dated Feb. 25, 2016 with English translation.
Chinese Office Action in Chinese Application No. 201510325070.9, dated Jan. 24, 2017 with English translation.

* cited by examiner

TESTING METHOD FOR SPLICING SCREENS

CROSS REFERENCE TO RELATED APPLICATIONS

This application is a continuation-in-part of U.S. patent application Ser. No. 15/122,702 filed on Aug. 31, 2016 which is the National Stage of PCT/CN2015/092919 filed on Oct. 27, 2015, and which claims priority under 35 U.S.C. § 119 of Chinese Application No. 201510325070.9 filed on Jun. 12, 2015, the disclosures of which are incorporated by reference.

TECHNICAL FIELD

The present disclosure relate to a testing method for splicing screens.

BACKGROUND

A splicing screen is a complete display unit, and not only can be separately used as a display, but also can be spliced into an oversized screen for use. According to different use demands, a display screen formed by splicing the splicing screens can achieve a changeable function of becoming large or small. The display screen is a complete finished product, can be immediately used when being hung, and is simple in installation just like piling up building blocks. Both splicing use and installation of single or a plurality of splicing screens are very simple, and requirements of clients for various sizes of display screens are met.

In the existing technical solution, after the splicing screens are spliced to form the display screen, the display screen is immediately put into use; however, before the display screen is put into use, the splicing screens in the display screen will not be subjected to any tests, therefore causing various display defects in the displaying process of the splicing screens, e.g., display errors of the adjacent splicing screens or an image distortion and the like.

SUMMARY

At least one embodiment of the present disclosure provides a testing method and a testing apparatus for splicing screens, which are used for performing testing on the splicing screens. A testing result can be used for regulating the splicing screens, so that display defects generated in the displaying process of the splicing screens are reduced.

At least one embodiment of the present disclosure provides a testing method for splicing screens, including:

outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents; and testing the splicing screens through the testing contents.

Optionally, in two adjacent testing sub pictures, the testing contents of one testing sub picture include a main scale, and the testing contents of the other testing sub picture include an auxiliary scale corresponding to the main scale.

The testing the splicing screens through the testing contents includes:

obtaining displacement parameters between two adjacent splicing screens according to the main scale and the auxiliary scale in two adjacent testing sub pictures.

Optionally, the displacement parameters include a displacement difference, a first spacing is formed between scale values of the main scale, a second spacing is formed between scale values of the auxiliary scale, a total length of the main scale is greater than that of the auxiliary scale, and a difference between the first spacing and the second spacing is accuracy.

The obtaining the displacement parameters between two adjacent splicing screens according to the main scale and the auxiliary scale in two adjacent testing sub pictures includes:

searching corresponding scale value of the main scale and scale value of the auxiliary scale in two adjacent testing sub pictures;

if the scale value of the main scale is equal to the scale value of the auxiliary scale, setting a product of the equal scale value and the accuracy as the displacement difference; and if the scale value of the main scale is unequal to the scale value of the auxiliary scale, multiplying a difference between the scale value of the main scale and the scale value of the auxiliary scale by the first spacing, adding a multiplying result with a product of the scale value of the auxiliary scale and the accuracy, and obtaining an absolute value of an adding result so as to obtain the displacement difference.

Optionally, the displacement parameters include a displacement direction, scale values of the main scale are symmetrically arranged with a center point as a center, and scale values of the auxiliary scale are symmetrically arranged with a center point as a center.

The obtaining the displacement parameters between two adjacent splicing screens according to the main scale and the auxiliary scale in two adjacent testing sub pictures includes:

searching corresponding scale value of the main scale and scale value of the auxiliary scale in two adjacent testing sub pictures; and in the corresponding scale value of the main scale and the scale value of the auxiliary scale, if the scale value of the main scale is greater than or equal to the scale value of the auxiliary scale, determining one side of a center point, at which the corresponding scale value of the main scale and the scale value of the auxiliary scale are positioned, as the displacement direction.

Optionally, shapes of the main scales and the corresponding auxiliary scales include a straight line shape, a concentric circle shape or a rectangular-ambulatory-plane shape.

Optionally, one or a plurality of main scales and one or a plurality of corresponding auxiliary scales are formed in two adjacent testing sub pictures.

Optionally, the testing contents of each testing sub picture include a four-corner test graph, and one vertex angle of the four-corner test graph coincides with one vertex angle of an active display region of the splicing screen corresponding to the testing sub picture; and The testing the splicing screens through the testing contents includes:

determining a distortion of the four-corner test graph;

acquiring a vertical distance between a vertex of the vertex angle of each four-corner test graph and a horizontal line of the vertex angle of the corresponding active display region, multiplying the vertical distance by two, and then dividing an obtained result by a side length of undistorted four-corner test graph in a vertical direction so as to obtain a vertical deformation; and acquiring a horizontal distance between the vertex of the vertex angle of each four-corner test graph and a vertical line of the vertex angle of the corresponding active display region, multiplying the horizontal distance by two, and then dividing an obtained result by a side length of undistorted four-corner test graph in a horizontal direction so as to obtain a horizontal deformation.

Optionally, in two adjacent testing sub pictures, the testing contents of one testing sub picture include a first gray scale comparison card, and the testing contents of the other testing sub picture include a second gray scale comparison card corresponding to the first gray scale comparison card.

The testing the splicing screens through the testing contents includes:

Comparing the first gray scale comparison card with the second gray scale comparison card so as to judge whether gray scales of two adjacent testing sub pictures are the same.

Optionally, in two adjacent testing sub pictures, the testing contents of one testing sub picture include a first chromaticity comparison card, and the testing contents of the other testing sub picture include a second chromaticity comparison card corresponding to the first chromaticity comparison card.

The testing the splicing screens through the testing contents includes:

comparing the first chromaticity comparison card with the second chromaticity comparison card so as to judge whether chromaticities of the two adjacent testing sub pictures are the same.

Optionally, the testing contents of four adjacent testing sub pictures include a testing line respectively, and four testing lines are sequentially and adjacently arranged.

The testing the splicing screens through the testing contents includes:

judging whether the four testing lines intersect at one point; and if the four testing lines do not intersect at one point, determining that splicing centers of four adjacent splicing screens do not correspond mutually.

At least one embodiment of the present disclosure provides a testing apparatus for splicing screens, including:

an outputting module, configured to output an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include the testing contents; and a testing module, configured to test the splicing screens through the testing contents.

Optionally, in two adjacent testing sub pictures, the testing contents of one testing sub picture include a main scale, and the testing contents of the other testing sub picture include an auxiliary scale corresponding to the main scale.

The testing module is configured to obtain displacement parameters between two adjacent splicing screens according to the main scale and the auxiliary scale in two adjacent testing sub pictures.

Optionally, the testing contents of the testing sub picture include a four-corner test graph, and one vertex angle of the four-corner test graph coincides with one vertex angle of the active display region of the splicing screen corresponding to the testing sub picture.

The testing module includes:

a determining sub-module, configured to determine a distortion of the four-corner test graph;

a first acquisition sub-module, configured to acquire a vertical distance between a vertex of the vertex angle of the four-corner test graph and a horizontal line of the vertex angle of the corresponding active display region, multiply the vertical distance by two, and then divide the obtained result by the side length of undistorted four-corner test graph in the vertical direction so as to obtain the vertical deformation; and a second acquisition sub-module, configured to acquire a horizontal distance between the vertex of the vertex angle of the four-corner test graph and a vertical line of the vertex angle of the corresponding active display region, multiply the horizontal distance by two, and then divide the obtained result by the side length of the undistorted four-corner test graph in the horizontal direction so as to obtain the horizontal deformation.

Optionally, in two adjacent testing sub pictures, the testing contents of one testing sub picture include the first gray scale comparison card, and the testing contents of the other testing sub picture include the second gray scale comparison card corresponding to the first gray scale comparison card.

The testing module is configured to compare each first gray scale comparison card with the corresponding second gray scale comparison card so as to judge whether gray scales of two adjacent testing sub pictures are the same.

Optionally, in two adjacent testing sub pictures, the testing contents of one testing sub picture include the first chromaticity comparison card, the testing contents of the other testing sub picture include the second chromaticity comparison card corresponding to the first chromaticity comparison card.

The testing module is configured to compare each first chromaticity comparison card with the corresponding second chromaticity comparison card so as to judge whether chromaticities of two adjacent testing sub pictures are the same.

In the technical solution of the testing method and testing apparatus for the splicing screens, which are provided by at least one embodiment of the present disclosure, the image signal is output to the display screen, the display screen includes a plurality of splicing screens, the image signal includes a plurality of testing sub pictures so as to enable the splicing screens to display the corresponding testing sub pictures, the testing sub pictures include the testing contents, and the splicing screens are tested through the testing contents. The technical solution of the present disclosure achieves testing on the splicing screens, and a testing result can be used for regulating the splicing screens, so that defects generated in the displaying process of the splicing screens are reduced.

DETAILED DESCRIPTION

In order to make those skilled in the art understand the technical solution of the present disclosure better, a testing method and testing apparatus for splicing screens, which are provided by the present disclosure, will be described in details in the following in connection with the drawings.

Figure 1:
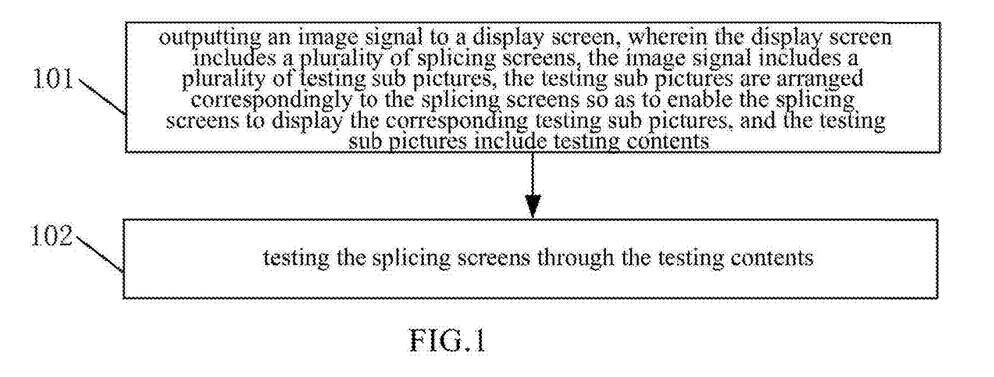
FIG. 1 is a flow chart of a testing method for splicing screens, which is provided by a first embodiment of the present disclosure.

FIG. 1 is a flow chart of a testing method for splicing screens, which is provided by a first embodiment of the present disclosure. As shown in FIG. 1, the method includes steps of:

S101: outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents; and S102: testing the splicing screens through the testing contents.

In the practical test method, before the step of S101, that is, before outputting an image signal to a display screen, all display units in each splicing screen are set to standard states that are factory default settings or manufacturer specified settings.

Figure 2A:
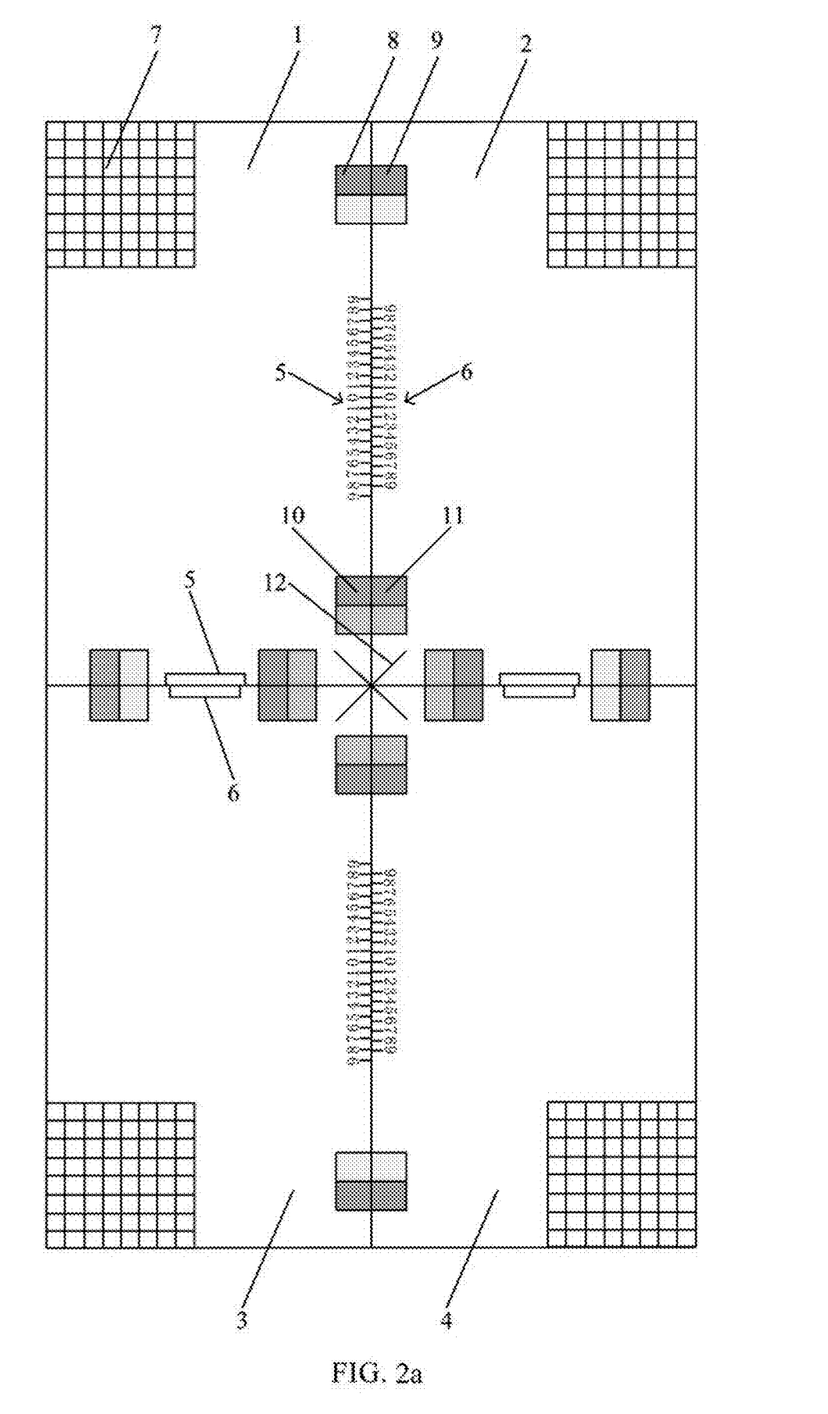
FIG. 2a is a schematic diagram of displaying an image signal by the splicing screens in the first embodiment.

FIG. 2a is a schematic diagram of displaying the image signal by the splicing screens in the first embodiment. As shown in FIG. 2a, the display screen is formed by splicing a plurality of splicing screens. In the embodiment, four splicing screens are spliced into one display screen, which is taken as an example for description. The display screen includes a splicing screen 1, a splicing screen 2, a splicing screen 3 and a splicing screen 4, wherein the splicing screen 1 is positioned on the top left, the splicing screen 2 is positioned on the top right, the splicing screen 3 is positioned on the bottom left, the splicing screen 4 is positioned on the bottom right, and the splicing screen 1, the splicing screen 2, the splicing screen 3 and the splicing screen 4 are arranged into the square display screen in a 2*2 array manner.

The plurality of testing sub pictures in the image signal can be different portions of one picture, or each testing sub picture in the image signal can be one separate picture. In the embodiment, for example, the plurality of testing sub pictures in the image signal can be different portions of one picture. Each testing sub picture corresponds to one splicing screen, and each splicing screen in FIG. 2a respectively displays the corresponding testing sub picture. According to actual testing requirements, each testing sub picture can include one or a plurality of testing contents. Each splicing screen displays the corresponding testing sub picture. It should be noted that FIG. 2a shows the schematic diagram when the splicing screens normally display the pictures, i.e., the schematic diagram of display of the splicing screens which have no display abnormality by testing, and the image signal displayed by the splicing screens is in a normal state, and thus, the image signal displayed in FIG. 2a can be used as a standard image signal.

Figure 2B:
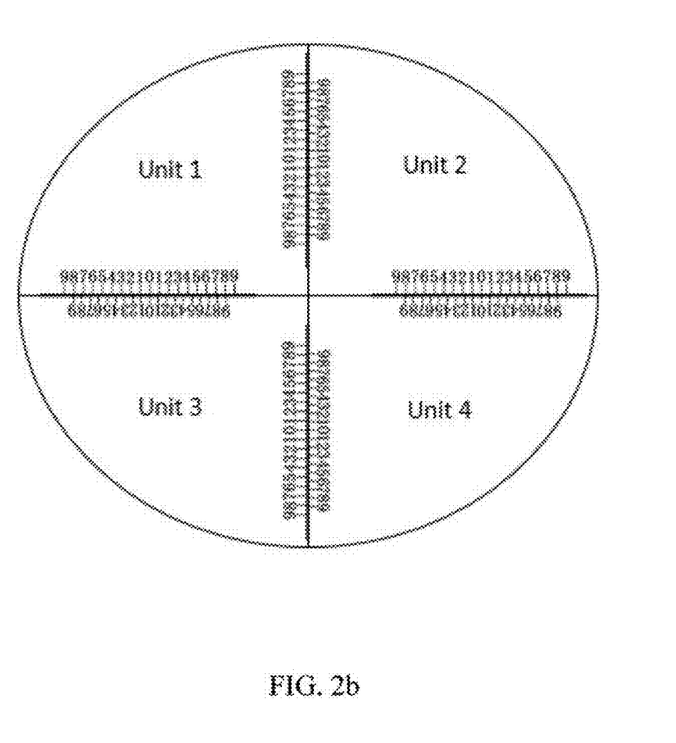
FIG. 2b is a schematic diagram of applying a circle signal in the first embodiment.
Figure 2C:
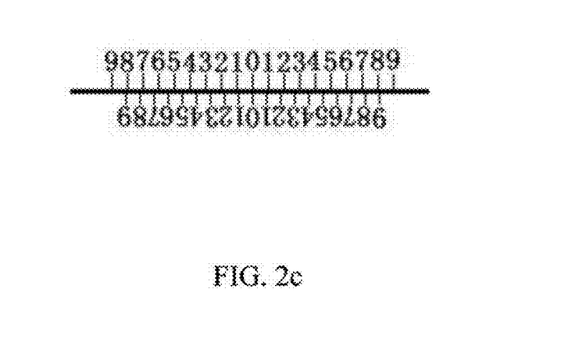
FIG. 2c is a schematic diagram of applying a graduation signal in the first embodiment.

As shown in FIG. 2b and FIG. 2c, the testing contents can include a circle signal and a graduation signal. The circle signal and the graduation signal are input separately to each 2*2 display units in a splicing screen for the purpose of measurement.

In detail, as shown in FIG. 2b, display effect of a whole splicing screen is measured preliminarily by the circle signal.

In addition, as shown in FIG. 2c, the displacement of the boundaries between two adjacent active areas in vertical and horizontal directions of the display units is measured accurately by the graduation signal. The graduation signal may comprise a main scale and an auxiliary scale corresponding to the main scale.

Depending on different circumstances, the testing contents can include other signals. For example, the testing contents can include one or a random combination of the main scale and the auxiliary scale, a four-corner test graph, a gray scale comparison card, a chromaticity comparison card and a testing line.

As shown in FIG. 2a, in two adjacent testing sub pictures, the testing contents of one testing sub picture include a main scale 5, and the testing contents of the other testing sub picture include an auxiliary scale 6 corresponding to the main scale. For example, the main scale 5 and the corresponding auxiliary scale 6 are arranged adjacently, the main scale 5 is arranged at the edge of one testing sub picture, and the corresponding auxiliary scale 6 is arranged at the edge of the adjacent testing sub picture. For example, the testing contents of the testing sub picture displayed by the splicing screen 1 include the main scale 5, and the testing contents of the testing sub picture displayed by the splicing screen 2 include the corresponding auxiliary scale 6. It should be noted that specific scales of some of the main scales 5 and the corresponding auxiliary scales 6 are not drawn in the drawing. It can be seen from FIG. 2a that the main scale 5 and the corresponding auxiliary scale 6 are respectively arranged at the adjacent edges of each two adjacent testing sub pictures. Shapes of the main scales 5 and the corresponding auxiliary scales 6 include a straight line shape, a concentric circle shape or a rectangular-ambulatory-plane shape and the like. In the embodiment, for example, the main scales 5 and the corresponding auxiliary scales 6 are of a straight line shape. In two adjacent testing sub pictures, one or a plurality of main scales 5 and one or a plurality of corresponding auxiliary scales 6 are formed. In the embodiment, for example, in two adjacent testing sub pictures, one main scale 5 and one corresponding auxiliary scale 6 are formed.

As shown in FIG. 2a, the testing contents of the testing sub picture include a four-corner test graph 7, and one vertex angle of the four-corner test graph 7 coincides with one vertex angle of an active display region of the splicing screen corresponding to the testing sub picture, wherein the active display region can be an A-A region of the splicing screen. For example, the four-corner test graph 7 is positioned on the top left corner of the testing sub picture corresponding to the splicing screen 1, the four-corner test graph 7 is positioned on the top right corner of the testing sub picture corresponding to the splicing screen 2, the four-corner test graph 7 is positioned on the bottom left corner of the testing sub picture corresponding to the splicing screen 3, and the four-corner test graph 7 is positioned on the bottom right corner of the testing sub picture corresponding to the splicing screen 4. For example, patterns of the four-corner test graphs are grids, i.e., the four-corner test graphs are four-corner grid graphs. In the practical application, the four-corner test graphs also can have other patterns, which are not illustrated herein.

As shown in FIG. 2a, in two adjacent testing sub pictures, the testing contents of one testing sub picture include a first gray scale comparison card 8, and the testing contents of the other testing sub picture include a second gray scale comparison card 9 corresponding to the first gray scale comparison card 8. For example, the first gray scale comparison card 8 and the corresponding second gray scale comparison card 9 are arranged adjacently. The first gray scale comparison card 8 is arranged at the edge of one testing sub picture, and the corresponding second gray scale comparison card 9 is arranged at the edge of the adjacent testing sub picture. For example, the testing contents of the testing sub picture displayed by the splicing screen 1 include the first gray scale comparison card 8, and the testing contents of the testing sub picture displayed by the splicing screen 2 include the corresponding second gray scale comparison card 9. It can be seen from FIG. 2a that the first gray scale comparison card 8 and the corresponding second gray scale comparison card 9 are respectively arranged at the adjacent edges of each two adjacent testing sub pictures, wherein two gray scale bars are respectively arranged in the first gray scale comparison card 8 and the corresponding second gray scale comparison card 9. In the practical application, a greater number of gray scale bars also can be arranged as required.

As shown in FIG. 2a, in two adjacent testing sub pictures, the testing contents of one testing sub picture include a first chromaticity comparison card 10, and the testing contents of the other testing sub picture include a second chromaticity comparison card 11 corresponding to the first chromaticity comparison card 10. For example, the first chromaticity comparison card 10 and the corresponding second chromaticity comparison card 11 are arranged adjacently. The first chromaticity comparison card 10 is arranged at the edge of one testing sub picture, and the corresponding second chromaticity comparison card 11 is arranged at the edge of the adjacent testing sub picture. For example, the testing contents of the testing sub picture displayed by the splicing screen 1 include the first chromaticity comparison card 10, and the testing contents of the testing sub picture displayed by the splicing screen 2 include the corresponding second chromaticity comparison card 11. It can be seen from FIG. 2a that the first chromaticity comparison card 10 and the corresponding second chromaticity comparison card 11 are respectively arranged at the adjacent edges of each two adjacent testing sub pictures, wherein two chromaticity bars are respectively arranged in the first chromaticity comparison card 10 and the corresponding second chromaticity comparison card 11. In the practical application, a greater number of chromaticity bars also can be arranged as required.

As shown in FIG. 2a, the testing contents of four adjacent testing sub pictures include a testing line 12 respectively, and four testing lines 12 are sequentially and adjacently arranged. As shown in FIG. 2a, the four testing lines 12 are positioned at a spliced position of four splicing screens, and the spliced position can be called as a spliced center. The testing lines 12 can be of a straight line or curve shape. In the embodiment, for example, the testing lines 12 can be of a straight line shape.

In practical application, the testing contents can further include other contents, which are not illustrated herein.

For example, the splicing screens can include a Liquid Crystal Display (LCD), a Light Emitting Diode (LED) splicing screen or an Organic Light-Emitting Diode (OLED) splicing screen.

As the above, in S102, the splicing screens are tested through the testing contents.

In the step, for different testing contents, different types of testing on the splicing screens can be achieved.

In the embodiment, after testing on the splicing screens is completed through different testing contents, if a phenomenon of poor display occurs, the splicing screens can be correspondingly regulated with respect to the phenomenon of poor display so as to solve the problem of the phenomenon of poor display.

In the testing method for the splicing screens, which is provided by the embodiment, the image signal is output to the display screen, the display screen includes a plurality of splicing screens, the image signal includes a plurality of testing sub pictures so as to enable the splicing screens to display the corresponding testing sub pictures, the testing sub pictures include the testing contents, and the splicing screens are tested through the testing contents. The technical solution of the embodiment achieves testing on the splicing screens, and a testing result can be used for regulating the splicing screens, so that defects generated in the displaying process of the splicing screens are reduced. The testing method provided by the embodiment is simple, easy to operate and accurate in testing result.

A second embodiment of the present disclosure provides a testing method for splicing screens. The method includes steps of:

S201: outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents.

The specific description on the S201 can refer to the S101 in the first embodiment, and the S201 is not particularly described herein.

S202: testing the splicing screens through the testing contents.

In the embodiment, the S202 particularly includes: obtaining displacement parameters between two adjacent splicing screens according to the main scale and the auxiliary scale in two adjacent testing sub pictures, wherein the displacement parameters can include a displacement difference and/or a displacement direction. For example, the S202 in the embodiment can be executed by an operator.

Figure 3:
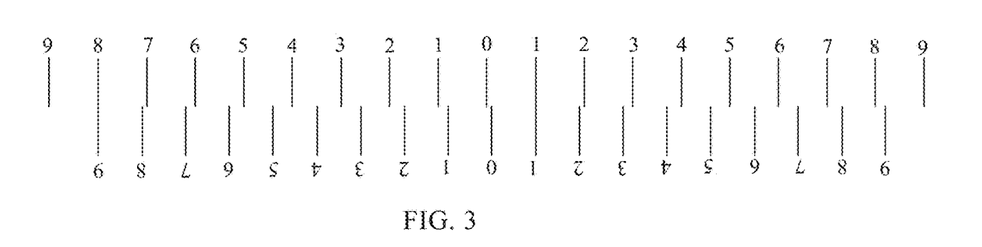
FIG. 3 is a schematic diagram of testing a displacement difference in a second embodiment.
Figure 4:
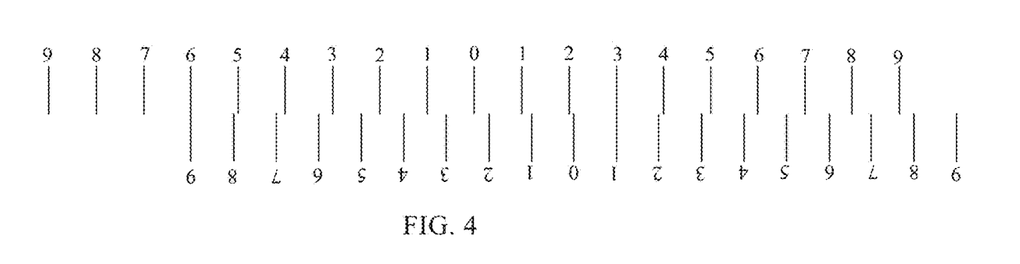
FIG. 4 is another schematic diagram of testing the displacement difference in the second embodiment.

If the displacement parameters include the displacement difference, as shown in FIG. 2a, a first spacing is formed between scale values of the main scale 5, a second spacing is formed between scale values of the auxiliary scale 6, a total length of the main scale 5 is greater than that of the corresponding auxiliary scale 6, and the first spacing is greater than the second spacing. Scale values of the main scale 5 are equally divided scale values, and the first spacing is a minimum scale length of the main scale 5; and scale values of the auxiliary scale 6 are equally divided scale values, and the second spacing is a minimum scale length of the auxiliary scale 6. Then, the total length of the main scale 5 can be equal to a product of the first spacing and the number of the equally divided scale values, and for example, as shown in FIG. 2a, the number of the equally divided scale values of the main scale 5 is 18, and then the total length of the main scale 5 is equal to a product of 18 and the first spacing, wherein the number of the scale values does not involve the scale value 0; and the total length of the auxiliary scale 6 can be equal to a product of the second spacing and the number of the equally divided scale values, and for example, as shown in FIG. 2a, the number of the equally divided scale values of the auxiliary scale 6 is 18, and then the total length of the auxiliary scale 6 is equal to a product of 18 and the second spacing, wherein the number of the scale values does not involve the scale value 0. The first spacing is greater than the second spacing, so the total length of each main scale 5 is greater than that of the corresponding auxiliary scale 6. In the embodiment, a difference between the first spacing and the second spacing is accuracy. The unit of the scale values of the main scales 5 and the scale values of the auxiliary scales 6 can be set as any unit, e.g., millimeter, centimeter or pixel and the like. In the embodiment, for example, the pixel is adopted, and then the first spacing is 10 pixels, the second spacing is 9 pixels, and the accuracy is 1 pixel. When the first spacing and the second spacing adopt other values, the accuracy also can be other values, and for example, the accuracy can be 0.1 or 0.01 pixel. FIG. 2a shows a normal display state, so the scale value 0 of the main scale 5 corresponds to the scale value 0 of the corresponding auxiliary scale 6. The second spacing is smaller than the first spacing, so other scale values of the main scale 5 do not correspond to other scale values of the auxiliary scale 6. In the embodiment, the scale values of the main scale 5 are symmetrically arranged with a center point as a center, the scale values of the auxiliary scale are symmetrically arranged with a center point as a center, the center point can be the scale value 0, and except that the center points of the main scale 5 and the auxiliary scale 6 correspond to each other, all other scale values on both sides of the center points do not correspond to each other. By taking the scale values on one side of the center point as example, the scale value 1 of the main scale 5 differs from the scale value 1 of the corresponding auxiliary scale 6 by 1 pixel, the scale value 2 of the main scale 5 differs from the scale value 2 of the auxiliary scale 6 by 2 pixels, and so on, and the scale value 9 of the main scale 5 differs from the scale value 9 of the auxiliary scale 6 by 9 pixels. FIG. 3 is a schematic diagram of testing the displacement difference in the second embodiment. As shown in FIG. 3, corresponding scale values of the main scale 5 and scale values of the auxiliary scale 6 in two adjacent testing sub pictures are searched. In FIG. 3, the scale value 1 of the main scale 5 of the testing sub picture corresponding to the splicing screen 1 corresponds to the scale value 1 of the auxiliary scale 6 of the testing sub picture corresponding to the splicing screen 2, i.e., the scale value of the main scale 5 is equal to the corresponding scale value of the auxiliary scale 6, and in this case, a product of the equal scale value 1 and the accuracy can be set as the displacement difference, i.e., the displacement difference is 1*1=1 pixel. FIG. 4 is another schematic diagram of testing the displacement difference in the second embodiment. As shown in FIG. 4, the scale values of the main scale 5 and the corresponding scale values of the auxiliary scale 6 in each two adjacent testing sub pictures are searched, and in FIG. 4, the scale value 3 of the main scale 5 of the testing sub picture corresponding to the splicing screen 1 corresponds to the scale value 1 of the auxiliary scale 6 of the testing sub picture corresponding to the splicing screen 3, and the scale value 6 of the main scale 5 of the testing sub picture corresponding to the splicing screen 1 corresponds to the scale value 9 of the auxiliary scale 6 of the testing sub picture corresponding to the splicing screen 3, i.e., the scale values of the main scale 5 are unequal to the corresponding scale values of the auxiliary scale 6. In this case, a difference between the scale value 3 of the main scale 5 and the scale value 1 of the auxiliary scale 6 can be multiplied by the first spacing, a multiplying result is added with a product of the scale value 1 of the auxiliary scale 6 and the accuracy, an absolute value of an adding result is obtained so as to obtain the displacement difference, and particularly, the displacement difference is |(3−1)*10+1*1|=21 pixels. Meanwhile, on the other side of the scale value 0, the scale value 6 of the main scale 5 corresponds to the scale value 9 of the auxiliary scale 6, and in this case, a difference between the scale value 6 of the main scale 5 and the scale value 9 of the auxiliary scale 6 can be multiplied by the first spacing, a multiplying result is added with a product of the scale value 9 of the auxiliary scale 6 and the accuracy, an absolute value of an adding result is obtained so as to obtain the displacement difference, and particularly, the displacement difference is |(6−9)*10+9*1|=21 pixels.

If the displacement parameters include the displacement direction, the scale values of the main scale 5 are symmetrically arranged with the center point as the center, the scale values of the auxiliary scale 6 are symmetrically arranged with the center point as the center, and the center point can be the scale value 0. As shown in FIG. 3, the scale values of the main scale 5 and the corresponding scale values of the auxiliary scale 6 in two adjacent testing sub pictures are searched, and in FIG. 3, the scale value 1 of the main scale 5 of the testing sub picture corresponding to the splicing screen 1 corresponds to the scale value 1 of the auxiliary scale 6 of the testing sub picture corresponding to the splicing screen 2, and the scale value 8 of the main scale 5 of the testing sub picture corresponding to the splicing screen 1 corresponds to the scale value 9 of the auxiliary scale 6 of the testing sub picture corresponding to the splicing screen 2, wherein the scale value 1 of the main scale 5 is equal to the scale value 1 of the auxiliary scale 6, and then one side of the center point 0, at which the scale value 1 of the main scale 5 of the testing sub picture corresponding to the splicing screen 1 and the scale value 1 of the auxiliary scale 6 of the testing sub picture corresponding to the splicing screen 2 are positioned, is determined as the displacement direction, i.e., the displacement direction is upward, namely, the splicing screen 2 moves upwards by 1 pixel with respect to the splicing screen 1. As shown in FIG. 4, the scale values of the main scale 5 and the corresponding scale values of the auxiliary scale 6 in two adjacent testing sub pictures are searched, and in FIG. 4, the scale value 3 of the main scale 5 of the testing sub picture corresponding to the splicing screen 1 corresponds to the scale value 1 of the auxiliary scale 6 of the testing sub picture corresponding to the splicing screen 3, and the scale value 6 of the main scale 5 of the testing sub picture corresponding to the splicing screen 1 corresponds to the scale value 9 of the auxiliary scale 6 of the testing sub picture corresponding to the splicing screen 3, wherein the scale value 3 of the main scale 5 is greater than the scale value 1 of the auxiliary scale 6, and then one side of the center point 0, at which the scale value 3 of the main scale 5 of the testing sub picture corresponding to the splicing screen 1 and the scale value 1 of the auxiliary scale 6 of the testing sub picture corresponding to the splicing screen 3 are positioned, is determined as the displacement direction, i.e., the displacement direction is rightward, namely, the splicing screen 3 moves rightwards by 21 pixels with respect to the splicing screen 1.

In the embodiment, when a displacement phenomenon occurring to the adjacent splicing screens is tested out, the splicing screens can be regulated to the proper positions through regulating retaining nuts of the splicing screens, thereby solving the problem of a phenomenon of display errors of the splicing screens.

In the testing method for the splicing screens, which is provided by the embodiment, the displacement parameters between two adjacent splicing screens are obtained according to the main scale and the auxiliary scale in two adjacent testing sub pictures, testing on the display errors generated by a splicing error of the splicing screens is achieved, and a testing result can be used for regulating the splicing screens, so that display error defect generated in the displaying process of the splicing screens is reduced.

A third embodiment of the present disclosure provides a testing method for splicing screens. The method includes steps of:

S301: outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents.

The specific description on the S301 can refer to the S101 in the first embodiment, and the S301 is not particularly described herein.

S302: testing the splicing screens through the testing contents.

Figure 5:
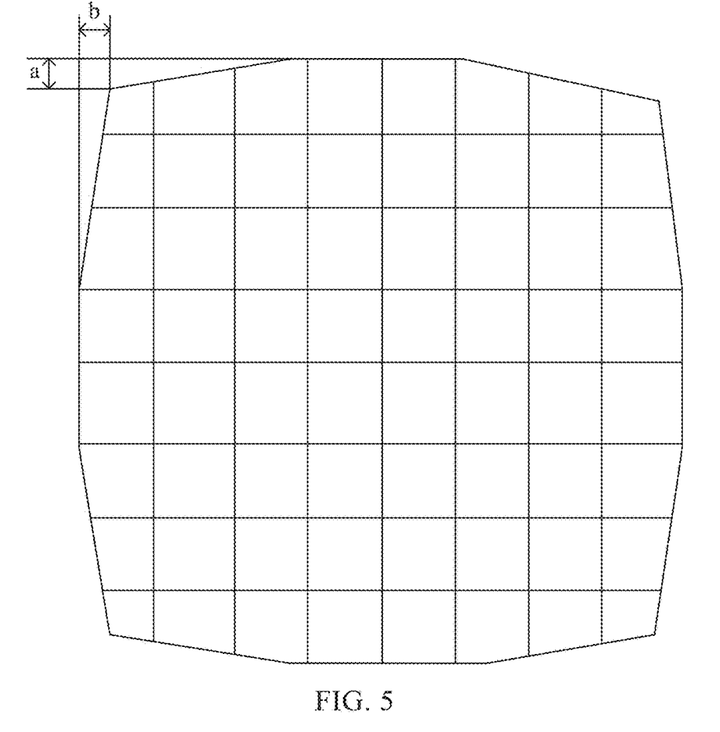
FIG. 5 is a schematic diagram of testing a distortion of a four-corner test graph in a third embodiment.
Figure 6:
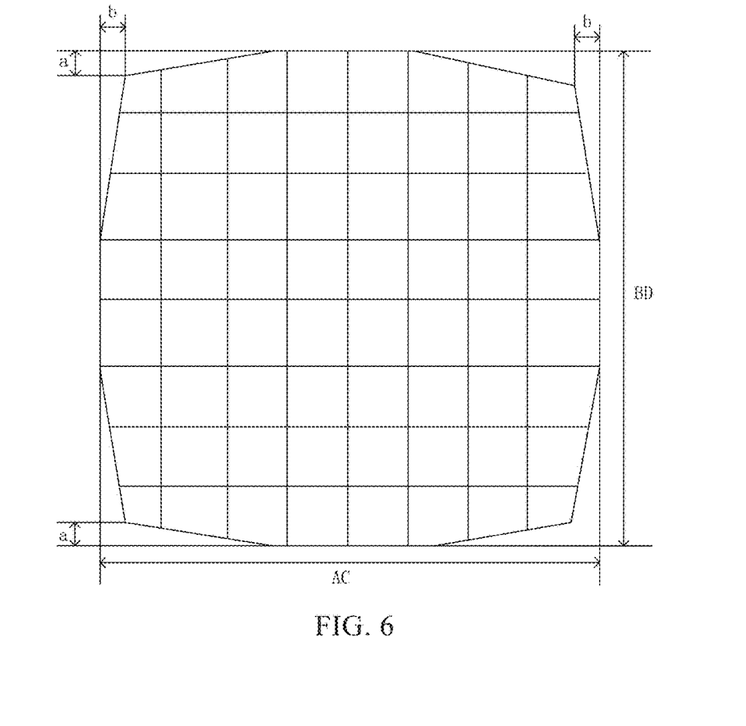
FIG. 6 is a schematic diagram of calculating deformations of the four-corner test graph in the third embodiment.

In the embodiment, the testing contents of the testing sub picture include a four-corner test graph, and one vertex angle of the four-corner test graph coincides with one vertex angle of an active display region of the splicing screen corresponding to the testing sub picture, wherein the active display region can be an A-A region of the splicing screen. FIG. 5 is a schematic diagram of testing a distortion of the four-corner test graph in the third embodiment. FIG. 6 is a schematic diagram of calculating deformations of the four-corner test graph in the third embodiment. As shown in FIG. 5 and FIG. 6, in the embodiment, by taking the splicing screen 1 as example, the four-corner test graph 7 in the splicing screen 1 is positioned on the top left corner of the testing sub picture corresponding to the splicing screen 1, and the vertex angle of the top left corner of the four-corner test graph 7 coincides with that of the top left part of the active display region of the splicing screen 1. Then, the S302 particularly includes steps of:

S3021: determining a distortion of the four-corner test graph.

By comparing FIG. 2a with FIG. 5, it can be seen that the four-corner test graphs which are normal in display in FIG. 2a are of a square shape, and four vertex angles of the four-corner test graph in FIG. 5 are deformed inwards, and thus, the distortion of the four-corner test graph can be determined.

S3022: acquiring a vertical distance between a vertex of the vertex angle of the four-corner test graph and a horizontal line of the vertex angle of the active display region, multiplying the vertical distance by two, and then dividing an obtained result by a side length of undistorted four-corner test graph in a vertical direction so as to obtain a vertical deformation.

As shown in FIG. 5, the vertical distance between the vertex of the vertex angle of the four-corner test graph and the horizontal line of the vertex angle of the active display region is a. In order to facilitate calculating the deformation, the distorted four-corner test graph in FIG. 5 is overlapped with the undistorted four-corner test graph FIG. 2a to form FIG. 6. As shown in FIG. 6, deformations of two vertex angles in the vertical direction are set to be equal, and the side length of the undistorted four-corner test graph in the vertical direction is set as BD, so the vertical deformation is equal to 2a/BD.

S3023: acquiring a horizontal distance between the vertex of the vertex angle of the four-corner test graph and a vertical line of the vertex angle of the active display region, multiplying the horizontal distance by two, and then dividing an obtained result by a side length of the undistorted four-corner test graph in a horizontal direction so as to obtain a horizontal deformation.

As shown in FIG. 5, the horizontal distance between the vertex of the vertex angle of the four-corner test graph and the vertical line of the vertex angle of the active display region is b. In order to facilitate calculating the deformation, the distorted four-corner test graph in FIG. 5 is overlapped with the undistorted four-corner test graph FIG. 2a to form FIG. 6. As shown in FIG. 6, deformations of two vertex angles in the horizontal direction are set to be equal, and the side length of the undistorted four-corner test graph in the horizontal direction is set as AC, so the horizontal deformation is equal to 2b/AC.

For example, the S302 in the embodiment can be executed by the operator.

In the embodiment, after the distortion phenomenon of the splicing screens is tested out, a data display signal can be regulated by a splicing screen control system so as to enable a displayed image to be normal, thereby solving the problem of the image distortion phenomenon of the splicing screens.

In the testing method for the splicing screens, which is provided by the embodiment, the vertical deformation and the horizontal deformation when the four-corner test graph is distorted are acquired, testing on the distortion condition of the splicing screens is achieved, and a testing result can be used for regulating the splicing screens, so that the image distortion defect generated in the displaying process of the splicing screens is reduced.

A fourth embodiment of the present disclosure provides a testing method for splicing screens. The method includes steps of:

S401: outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents.

The specific description on the S401 can refer to the S101 in the first embodiment, and the S401 is not particularly described herein.

S402: testing the splicing screens through the testing contents.

In the embodiment, in two adjacent testing sub pictures, the testing contents of one testing sub picture include a first gray scale comparison card 8, and the testing contents of the other testing sub picture include a second gray scale comparison card 9 corresponding to the first gray scale comparison card 8. As shown in FIG. 2a, in the embodiment, the testing sub picture corresponding to the splicing screen 1 and the testing sub picture corresponding to the adjacent splicing screen 2 are taken as example for description. The testing contents of the testing sub picture displayed by the splicing screen 1 include the first gray scale comparison card 8, and the testing contents of the testing sub picture displayed by the splicing screen 2 include the corresponding second gray scale comparison card 9. Then, the S402 particularly includes: comparing the first gray scale comparison card with the second gray scale comparison card so as to judge whether gray scales of two adjacent testing sub pictures are the same. Optionally, the first gray scale comparison card and the second gray scale comparison card can be compared by an optical tester so as to judge whether the gray scales of two adjacent testing sub pictures are the same. The optical tester can include a CA210 tester, a topcon tester or a multimedia display detector. Or, the process also can be completed by the operator via observation. As shown in FIG. 2a, the first gray scale comparison card 8 in the testing sub picture corresponding to the splicing screen 1 can be compared with the second gray scale comparison card 9 in the testing sub picture corresponding to the splicing screen 2; if the gray scales of the first gray scale comparison card 8 and the second gray scale comparison card 9 are the same, the gray scales of two adjacent testing sub pictures are determined to be the same; and if the gray scales of the first gray scale comparison card 8 and the second gray scale comparison card 9 are different, the gray scales of two adjacent testing sub pictures are determined to be different.

In the embodiment, after a gray scale error occurring to the adjacent splicing screens is tested out, the gray scales of the splicing screens can be regulated by a splicing screen control system so as to enable the gray scales of the adjacent splicing screens to be consistent, thereby solving the problem of the gray scale error phenomenon of the splicing screens.

In the testing method for the splicing screens, which is provided by the embodiment, the first gray scale comparison card is compared with the second gray scale comparison card to judge whether the gray scales of two adjacent testing sub pictures are the same, testing on a gray scale error of each splicing screen is achieved, and a testing result can be used for regulating the splicing screens, so that the gray scale error defect generated in the displaying process of the splicing screens is reduced.

A fifth embodiment of the present disclosure provides a testing method for splicing screens. The method includes steps of:

S501: outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents.

The specific description on the S501 can refer to the S101 in the first embodiment, and the S501 is not particularly described herein.

S502: testing the splicing screens through the testing contents.

In the embodiment, in two adjacent testing sub pictures, the testing contents of one testing sub picture include a first chromaticity comparison card 10, the testing contents of the other testing sub picture include a second chromaticity comparison card 11 corresponding to the first chromaticity comparison card 10. As shown in FIG. 2a, in the embodiment, the testing sub picture corresponding to the splicing screen 1 and the testing sub picture corresponding to the adjacent splicing screen 2 are taken as example for description. The testing contents of the testing sub picture displayed by the splicing screen 1 include the first chromaticity comparison card 10, and the testing contents of the testing sub picture displayed by the splicing screen 2 include the corresponding second chromaticity comparison card 11. Then, the S502 particularly includes: comparing the first chromaticity comparison card with the second chromaticity comparison card so as to judge whether chromaticities of two adjacent testing sub pictures are the same. Optionally, the first chromaticity comparison card can be compared with the corresponding second chromaticity comparison card via an optical tester so as to judge whether the chromaticities of two adjacent testing sub pictures are the same. The optical tester can include a CA210 tester, a topcon tester or a multimedia display detector. Or, the process also can be completed by the operator via observation. As shown in FIG. 2a, the first chromaticity comparison card 10 in the testing sub picture corresponding to the splicing screen 1 can be compared with the second chromaticity comparison card 11 in the testing sub picture corresponding to the splicing screen 2; if the chromaticities of the first chromaticity comparison card 10 and the second chromaticity comparison card 11 are the same, the chromaticities of two adjacent testing sub pictures are determined to be the same; and if the chromaticities of the first chromaticity comparison card 10 and the second chromaticity comparison card 11 are different, the chromaticities of two adjacent testing sub pictures are determined to be different.

In the embodiment, after a chromaticity error occurring to the adjacent splicing screens is tested out, the chromaticities of the splicing screens can be regulated by a splicing screen control system so as to enable the chromaticities of the adjacent splicing screens to be consistent, thereby solving the problem of the chromaticity error phenomenon of the splicing screens.

In the testing method for the splicing screens, which is provided by the embodiment, the first chromaticity comparison card is compared with the second chromaticity comparison card to judge whether the chromaticities of two adjacent testing sub pictures are the same, testing on a chromaticity error of each splicing screen is achieved, and a testing result can be used for regulating the splicing screens, so that the chromaticity error defect generated in the displaying process of the splicing screens is reduced.

A sixth embodiment of the present disclosure provides a testing method for splicing screens. The testing method includes steps of:

S601: outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents.

The specific description on the S601 can refer to the S101 in the first embodiment, and the S601 is not particularly described herein.

S602: testing the splicing screens through the testing contents.

In the embodiment, the testing contents of four adjacent testing sub pictures include a testing line respectively, and four testing lines are adjacently arranged. As shown in FIG. 2a, the testing contents of the testing sub picture corresponding to the splicing screen 1, the testing sub picture corresponding to the splicing screen 2, the testing sub picture corresponding to the splicing screen 3 and the testing sub picture corresponding to the splicing screen 4 respectively include the testing lines 12, four testing lines 12 are sequentially and adjacently arranged, and the four testing lines 12 are positioned at a spliced position of four splicing screens. Then, the S602 particularly includes: judging whether four testing lines intersect at one point; and if the four testing lines do not intersect at one point, determining that splicing centers of four adjacent splicing screens do not correspond mutually. As shown in FIG. 2a, the testing lines 12 of the testing sub picture corresponding to the splicing screen 1, the testing sub picture corresponding to the splicing screen 2, the testing sub picture corresponding to the splicing screen 3 and the testing sub picture corresponding to the splicing screen 4 can be judged whether to intersect at one point; if four testing lines 12 intersect at one point, the splicing centers of four adjacent splicing screen 1, splicing screen 2, splicing screen 3 and splicing screen 4 are determined to correspond mutually; and if four testing lines do not intersect at one point, the splicing centers of four adjacent splicing screen 1, splicing screen 2, splicing screen 3 and splicing screen 4 are determined not to correspond mutually.

For example, the S602 in the embodiment can be executed by the operator.

In the embodiment, after it is determined that the splicing centers of four adjacent splicing screens do not correspond mutually, the splicing screens can be regulated to the proper positions through regulating retaining nuts of the splicing screens, thereby solving the problem of a phenomenon of display errors of the splicing screens.

In the testing method for the splicing screens, which is provided by the embodiment, the testing lines of testing child graphics in four adjacent testing sub pictures are judged whether to intersect at one point, the splicing centers of four adjacent splicing screens are determined not to correspond mutually if four testing lines do not intersect at one point. Testing on the splicing condition of the splicing centers of four splicing screens is achieved, and a testing result can be used for regulating the splicing screens, so that the display error defect generated in the displaying process of the splicing screens is reduced.

Figure 7:
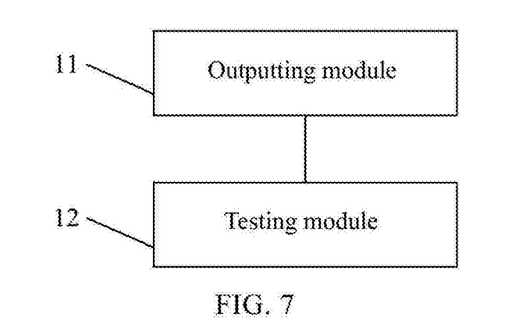
FIG. 7 is a structural schematic diagram of a testing apparatus for splicing screens, which is provided by a seventh embodiment of the present disclosure.

FIG. 7 is a structural schematic diagram of a testing apparatus for splicing screens, which is provided by a seventh embodiment of the present disclosure. As shown in FIG. 7, the apparatus includes: an outputting module 11 and a testing module 12.

The outputting module 11 is configured to output an image signal to a display screen, the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents; and the testing module 12 is configured to test the splicing screens through the testing contents.

In the embodiment, in two adjacent testing sub pictures, the testing contents of one testing sub picture can include a main scale, and the testing contents of the other testing sub picture can include an auxiliary scale corresponding to the main scale; and the testing module 12 is particularly configured to obtain displacement parameters between two adjacent splicing screens according to the main scale and the auxiliary scale in two adjacent testing sub pictures.

In the embodiment, the testing contents of the testing sub picture can include a four-corner test graph, and one vertex angle of the four-corner test graph coincides with one vertex angle of an active display region of the splicing screen corresponding to the testing sub picture; and the testing module 12 includes: a determining sub-module, a first acquisition sub-module and a second acquisition sub-module. The determining sub-module is configured to determine a distortion of the four-corner test graph; the first acquisition sub-module is configured to acquire a vertical distance between a vertex of the vertex angle of the four-corner test graph and a horizontal line of the vertex angle of the active display region, multiply the vertical distance by two, and then divide an obtained result by a side length of undistorted four-corner test graph in a vertical direction so as to obtain a vertical deformation; and the second acquisition sub-module is configured to acquire a horizontal distance between the vertex of the vertex angle of the four-corner test graph and a vertical line of the vertex angle of the active display region, multiply the horizontal distance by two, and then divide an obtained result by a side length of the undistorted four-corner test graph in a horizontal direction so as to obtain a horizontal deformation.

In the embodiment, in two adjacent testing sub pictures, the testing contents of one testing sub picture can include a first gray scale comparison card, the testing contents of the other testing sub picture can include a second gray scale comparison card corresponding to the first gray scale comparison card, and the first gray scale comparison card and the second gray scale comparison card are adjacently arranged. The testing module 12 is particularly configured to compare the first gray scale comparison card with the corresponding second gray scale comparison card so as to judge whether gray scales of two adjacent testing sub pictures are the same. For example, the testing module 12 can be an optical tester, and for example, the optical tester can include a CA210 tester, a topcon tester or a multimedia display detector.

In the embodiment, in two adjacent testing sub pictures, the testing contents of one testing sub picture can include a first chromaticity comparison card, the testing contents of the other testing sub picture can include a second chromaticity comparison card corresponding to the first chromaticity comparison card, and the first chromaticity comparison card and the second chromaticity comparison card are adjacently arranged. The testing module 12 is particularly configured to compare the first chromaticity comparison card with the second chromaticity comparison card so as to judge whether chromaticities of each two adjacent testing sub pictures are the same. For example, the testing module 12 can be an optical tester, and for example, the optical tester can include a CA210 tester, a topcon tester or a multimedia display detector.

In the technical solution of the testing apparatus for the splicing screens, which is provided by the embodiment, the outputting module outputs the image signal to the display screen, the display screen includes a plurality of splicing screens, the image signal includes a plurality of testing sub pictures so as to enable the splicing screens to display the corresponding testing sub pictures, the testing sub pictures include the testing contents, and the testing module tests the splicing screens through the testing contents. The technical solution of the present disclosure achieves testing on the splicing screens, and a testing result can be used for regulating the splicing screens, so that defects generated in the displaying process of the splicing screens are reduced.

It can be understood that the foregoing embodiments merely are exemplary embodiments for illustrating the principle of the present disclosure, and not intended to define the scope of the present disclosure. Those skilled in the art can make various modifications and improvements to the present disclosure without departure from the spirit and essence of the present disclosure. These modifications and improvements shall fall within the scope of protection of the present disclosure.

The present application claims priority of the Chinese Patent Application No. 201510325070.9 filed on Jun. 12, 2015, the disclosure of which are incorporated herein by its reference in its entirety as part of the present application.

The invention claimed is:

1. A testing method for splicing screens, comprising:
outputting an image signal to a display screen, wherein the display screen includes a plurality of splicing screens, the image signal includes a plurality of testing sub pictures, the testing sub pictures are arranged correspondingly to the splicing screens so as to enable the splicing screens to display the corresponding testing sub pictures, and the testing sub pictures include testing contents; and
testing the splicing screens through the testing contents, wherein the testing contents comprise a graduation signal, by which an accurate measurement is performed on the splicing screens and displacement parameters between two adjacent splicing screens are obtained.

2. The testing method for the splicing screens according to claim 1, wherein the graduation signal comprises a main scale and an auxiliary scale corresponding to the main scale, in two adjacent testing sub pictures, the testing contents of one testing sub picture include the main scale, and the testing contents of the other testing sub picture include the auxiliary scale; and
the testing the splicing screens through the testing contents includes:
obtaining displacement parameters between two adjacent splicing screens according to the main scale and the auxiliary scale in two adjacent testing sub pictures.

3. The testing method for the splicing screens according to claim 2, wherein the displacement parameters include a displacement difference, a first spacing is formed between scale values of the main scale, a second spacing is formed between scale values of the auxiliary scale, a total length of the main scale is greater than that of the auxiliary scale, and a difference between the first spacing and the second spacing is accuracy; and
the obtaining the displacement parameters between two adjacent splicing screens according to the main scale and the auxiliary scale in two adjacent testing sub pictures includes:
searching corresponding scale value of the main scale and scale value of the auxiliary scale in two adjacent testing sub pictures;
if the scale value of the main scale is equal to the scale value of the auxiliary scale, setting a product of the equal scale value and the accuracy as the displacement difference; and
if the scale value of the main scale is unequal to the scale value of the auxiliary scale, multiplying a difference between the scale value of the main scale and the scale value of the auxiliary scale by the first spacing, adding a multiplying result with a product of the scale value of the auxiliary scale and the accuracy, and obtaining an absolute value of an adding result so as to obtain the displacement difference.

4. The testing method for the splicing screens according to claim 2, wherein the displacement parameters include a displacement direction, the scale values of the main scale are symmetrically arranged with a center point as a center, and the scale values of the auxiliary scale are symmetrically arranged with a center point as a center; and
the obtaining the displacement parameters between two adjacent splicing screens according to the main scale and the auxiliary scale in two adjacent testing sub pictures includes:
searching corresponding scale value of the main scale and scale value of the auxiliary scale in two adjacent testing sub pictures; and
in the corresponding scale value of the main scale and the scale value of the auxiliary scale, if the scale value of the main scale is greater than or equal to the scale value of the auxiliary scale, determining one side of a center point, at which the corresponding scale value of the main scale and the scale value of the auxiliary scale are positioned, as the displacement direction.

5. The testing method for the splicing screens according to claim 2, wherein shapes of the main scales and the corresponding auxiliary scales include a straight line shape, a concentric circle shape or a rectangular-ambulatory-plane shape.

6. The testing method for the splicing screens according to claim 2, wherein one or a plurality of main scales and one or a plurality of corresponding auxiliary scales are formed in two adjacent testing sub pictures.

7. The testing method for the splicing screens according to claim 1, wherein before said step of outputting an image signal to a display screen, all display units in each splicing screen are set to standard states that are factory default settings or manufacturer specified settings.

8. The testing method for the splicing screens according to claim 1, wherein the testing contents further comprise a circle signal, by which a preliminary measurement is performed on the splicing screens.

* * * * *